United States Patent
Greenfield, Jr.

[19]

[11] Patent Number: 6,116,150

[45] Date of Patent: Sep. 12, 2000

[54] MULTI-LEVEL TOASTER

[76] Inventor: Walter Greenfield, Jr., 3302 Overcreek La., Midlothain, Va. 23112

[21] Appl. No.: 09/363,553

[22] Filed: Jul. 29, 1999

Related U.S. Application Data
[60] Provisional application No. 60/094,569, Jul. 29, 1998.

[51] Int. Cl.⁷ ............... A47J 37/00; A47J 37/08; A47J 37/10; A47J 43/20
[52] U.S. Cl. .................. 99/332; 99/331; 99/340; 99/374; 99/375; 99/378; 99/389; 99/390; 99/391; 99/400; 99/446; 99/448; 219/521; 219/492
[58] Field of Search ............. 99/325–334, 339, 99/340, 372–384, 385, 389–392, 400, 401, 446, 450; 219/482, 386, 521, 524, 492, 494, 497, 501; 426/391, 745, 445, 465, 496, 515, 523, 524, 492, 494, 521

[56] References Cited

U.S. PATENT DOCUMENTS

| | | |
|---|---|---|
| 1,955,867 | 4/1934 | Wilkie et al. . |
| 2,578,034 | 12/1951 | Baltzell . |
| 2,719,479 | 10/1955 | Rodwick . |
| 3,760,156 | 9/1973 | Kehl et al. . |
| 4,967,650 | 11/1990 | Weigle ........................ 99/374 |
| 4,970,949 | 11/1990 | Ferrara, Jr. et al. . |
| 5,299,492 | 4/1994 | Carbon et al. ................ 219/524 X |
| 5,320,030 | 6/1994 | Hubbard . |
| 5,379,685 | 1/1995 | Krasznai . |
| 5,584,231 | 12/1996 | Deleon . |
| 5,586,488 | 12/1996 | Liu . |
| 5,639,498 | 6/1997 | Bakosch . |
| 5,724,886 | 3/1998 | Ewald et al. ................. 99/448 X |

*Primary Examiner*—Timothy Simone
*Attorney, Agent, or Firm*—Saidman DesignLaw Group

[57] ABSTRACT

A vertically extending, cylindrical toaster having a plurality of modules which may be integrally joined together in a single housing or may be separably stacked one upon the other. Each module comprises at least one individual heating unit having a horizontally oriented aperture opening into the unit. Each heating unit is separated from its vertical neighbors by a heat insulating layer and includes a food receiving grill, an upper heating element located above the grill, a lower heating element located below the grill, and a removable tray below the lower heating element for catching crumbs or other food particles which fall from the grill. The grill may also be movable and/or removable for easy access to the food thereon or for cleaning. Master controls for all the modules and individual controls for each separate module are contemplated to provide versatile control of the cooking processes.

41 Claims, 11 Drawing Sheets

MULTI-LEVEL TOASTER

CROSS REFERENCE TO RELATED APPLICATION

This application claims the benefit of my prior U.S. Provisional Application Ser. No. 60/094,569, filed Jul. 29, 1998.

BACKGROUND

1. Field of the Invention

The present invention relates to a countertop kitchen appliance which occupies a minimum of kitchen counter space, i.e., has a small footprint, while increasing serving capacity over currently used similar appliances.

2. Description of Related Art

Toasters and toaster ovens are not new to the art. One common type of conventional toaster comprises two or four vertically-oriented heating units contained within a generally rectangular housing. Such toasters are common-place in households all over the world, and are perfectly suitable for households of one or two people. However, such toasters are do not have sufficient capacity for larger households, feeding guests, or commercial applications (such as restaurants or cafeterias) because only two or four items (toast, bagels, etc.) can be toasted at any one time. Moreover, providing a toaster having six or eight vertically-oriented toasting units is undesirable because of the excessive amount of counter space that would be required to accommodate large numbers of vertically oriented slots.

One potential solution to this problem is a toaster or toaster oven having a plurality of horizontally oriented slots which are stacked vertically. There have been attempts to design toasters and toaster ovens having such horizontally oriented toasting slots:

U.S. Pat. No. 2,578,034 to Baltzell shows a toaster having two horizontal elongated openings, each designed to accommodate a single food item in a horizontal orientation. Baltzell's toaster further includes a removable drip pan below each opening to receive butter, cheese and other materials likely to flow off of the edges of the food item being toasted. Baltzell does not teach or suggest providing more than two openings. In addition, Baltzell's toaster appears relatively large and bulky.

U.S. Pat. No. 2,719,479 to Rodwick shows a toaster having two rectangular horizontally-oriented slots. Rodwick does not teach or suggest a toaster having more than two toasting slots. In addition, Rodwick's toaster is specifically designed with large open areas within the toaster to allow droppings from the food article(s) being toasted to fall to the bottom of the toaster.

U.S. Pat. No. 5,586,488 to Liu teaches a portable pizza oven having a horizontal cooking chamber designed to receive a removable pan assembly. As with the references discussed above, Liu does not teach or suggest providing an oven having more than one cooking chamber.

U.S. Pat. No. 5,584,231 to DeLeon shows a tortilla warmer having a plurality of food enclosures. DeLeon shows one embodiment in which the food enclosures are horizontally oriented. However, DeLeon's tortilla warmer does not teach or suggest providing food enclosures which can be individually controlled. In addition, DeLeon does not teach or suggest providing a crumb catcher or drip tray between each food enclosure.

OBJECTS AND SUMMARY OF THE INVENTION

It is a primary object of the present invention to provide a toaster which can accommodate a large number of food items simultaneously, yet takes up little counter space.

It is another object of the present invention to provide a toaster having modular toasting units, thereby enabling any number of additional toasting units to be added at any time.

It is another object of the present invention to provide a toaster having multiple horizontal toasting units, each of which is individually controlled.

It is yet another object of the present invention to provide a toaster having multiple horizontal toasting units and a crumb catcher located below each toasting unit to prevent crumbs and other material from falling on the food being toasted below.

It is yet another object of the present invention to provide a toaster that is easy and inexpensive to manufacture.

It is yet another object of the present invention to provide a toaster having an aesthetically pleasing appearance.

These and other objects are achieved by the present invention which comprises a vertically extending, cylindrical structure having a plurality of modules which may be integrally joined together in a single housing or may be separably stacked one upon the other. Each module comprises at least one individual heating unit having a horizontally oriented aperture opening into the unit. Each heating unit is separated from its vertical neighbors by a heat insulating layer and includes a food receiving grill, an upper heating element located above the grill, a lower heating element located below the grill, and a removable tray below the lower heating element for catching crumbs or other food particles which fall from the grill. The grill may also be movable and/or removable for easy access to the food thereon or for cleaning.

Master controls for all the modules and individual controls for each separate module are contemplated to provide versatile control of the cooking processes.

BRIEF DESCRIPTION OF THE DRAWINGS

The present invention will be fully appreciated as the same becomes understood from the following detailed description of the best mode presently contemplated for carrying out the present invention when viewed in conjunction with the accompanying drawings, in which.

DETAILED DESCRIPTION OF THE PREFERRED EMBODIMENTS

For the purposes of this disclosure, the appliance will be described in terms of a toaster for toasting bread, although as will soon become apparent, it is not limited to this function nor to this product. It will be appreciated that the disclosed appliance comprises a central food processing system capable of defrosting, toasting, broiling, or heating a variety of food products, e.g., bread, bagels, pizzas, waffles, etc.

Further, the following disclosure emphasizes home use of the toaster, an environment of particular importance in view of the limited counterspace experienced in most home kitchens. Describing the invention in terms of home use is not intended to limit its utility thereto, however, for other cooking environs also suffer from limited counterspace and/or the need for multiple and/or simultaneous servings, e.g., commercial or institutional establishments such as restaurants, hospitals, school cafeterias, homeless shelters, etc. The modular embodiments described in FIGS. 13–17 are particularly suited for extra-domestic use, since they permit virtually unlimited expansion of the basic unit to fit the individual needs of a specific commercial or institutional establishment.

Whether at home or in a restaurant, hospital, or school, a serving of toast typically consists of two pieces of bread. Since the average family comprises more than two persons, all of whom have a reasonable expectation of being served fresh, hot toast simultaneously with the rest of the family, home toasters, which are limited to toasting only two or four pieces of bread simultaneously, are not usually up to the assignment. Commercial toasters, which extend this number to six or eight, could be purchased, and they would fill the bill, but they are usually too large for easy placement on home kitchen counters. Typically, home and commercial toasters in current use load the bread slices vertically through upwardly facing, rectangular apertures. While this is convenient for loading and unloading the toaster, it has the disadvantage of increasing the countertop area needed for the toaster proportionate to the number of slices toasted. The present invention resolves these conflicts.

Figure 1:
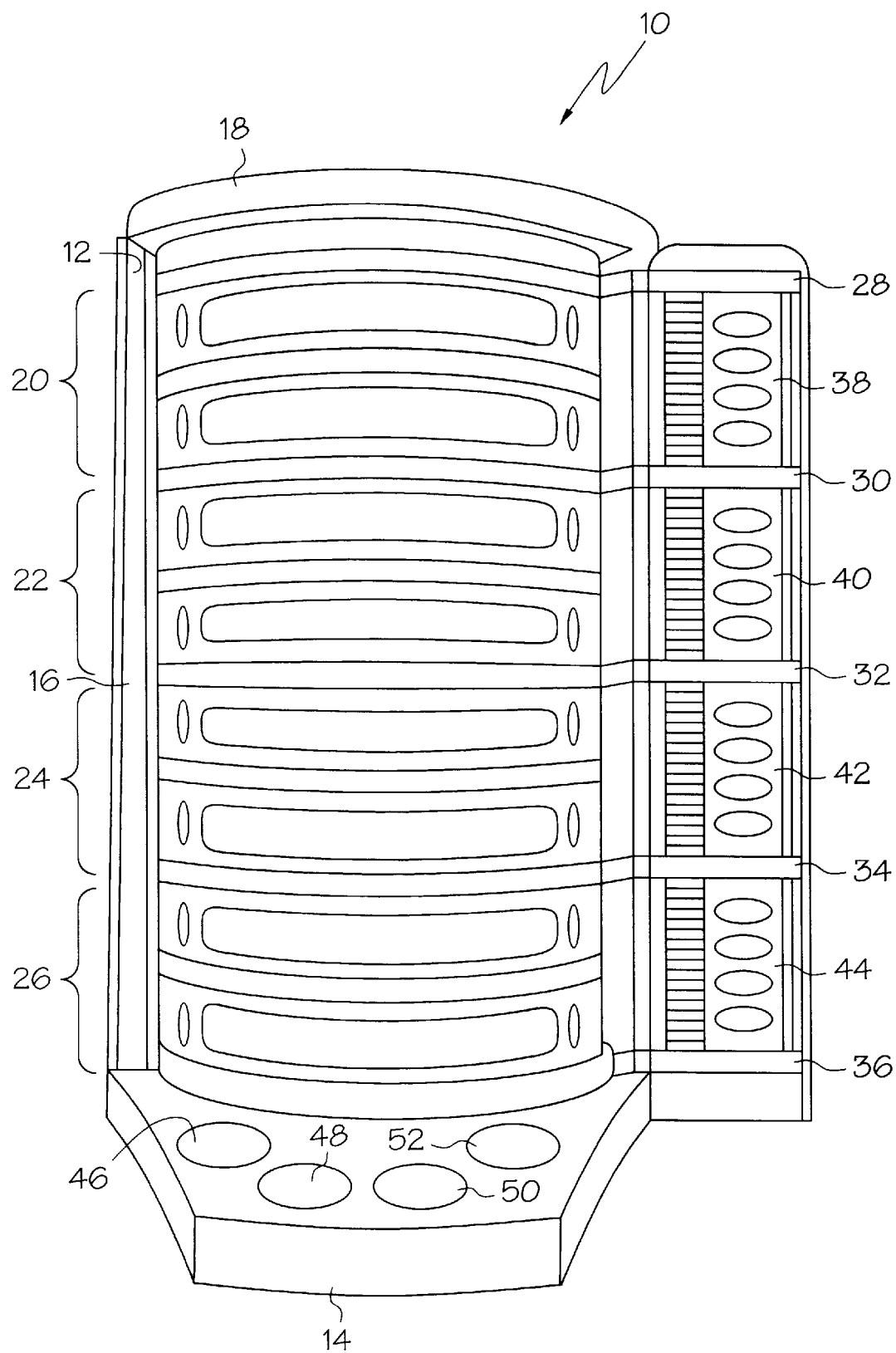
FIG. 1 is a front perspective view which illustrates a preferred embodiment of the present invention.
Figure 2:
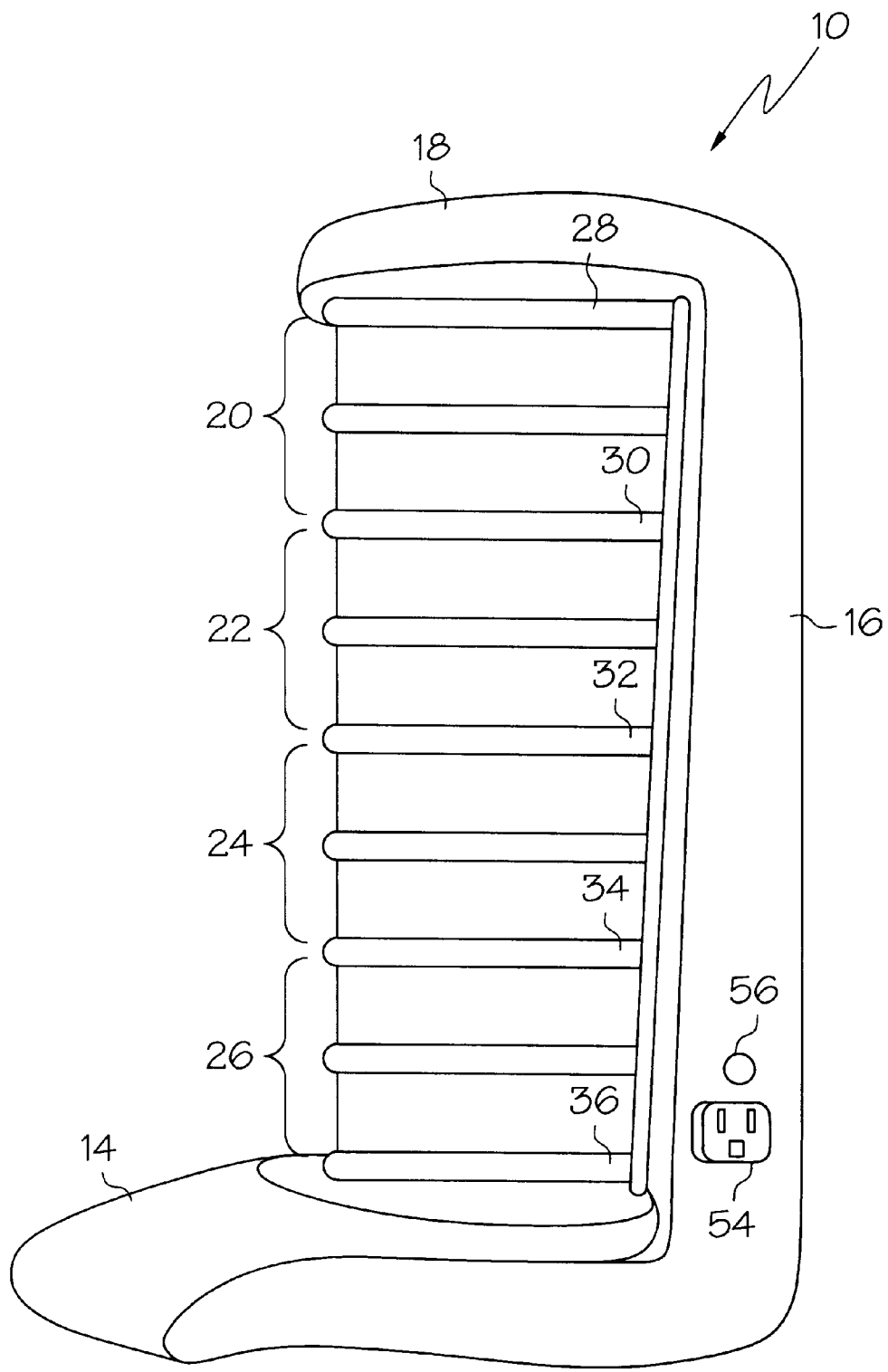
FIG. 2 shows a side perspective view of the appliance with an electrical outlet.

Referring to FIGS. 1 and 2, a preferred embodiment of the multi-level toaster of the present invention is indicated generally by reference numeral 10 and comprises a housing 12 including a base 14, a vertical, cylindrical wall 16, and a top 18. A plurality of toaster modules 20, 22, 24 and 26, each capable of simultaneously toasting two pieces of bread, are housed within housing 12. A plurality of floors 28, 30, 32, 34, and 36, integral with housing 12, serve to separate each toaster module from its adjacent neighbor.

Each toaster module 20, 22, 24 and 26 preferably has its own heating controls 38, 40, 42, and 44, respectively, for separately and individually setting the desired degree of toasting or browning of each two-piece serving. Heating control 44 is diagrammatically illustrative of the nature of the controls. They are not per se a main feature of the present invention, so they will not be described in detail, but nonetheless can be in the form of buttons, as shown, rotary dials, swing levers, sliding rheostats, computerized touch panels, or any combination thereof. Whatever form of heating control is chosen, it is preferably illuminated when on and darker when off to clearly indicate which toaster module is being used. Only four toaster modules are shown, but it is obvious the number can be extended to whatever is desired, space permitting.

Four master controls 46, 48, 50, and 52 are preferably located in base 14. Such controls are shown as buttons, which are also preferably illuminated when in use, for selecting the type of cooking desired for the toaster modules in multi-level toaster 10. The nature of the type of cooking controlled by each master control will be chosen by the designer or manufacturer, but they would typically include defrosting, toasting, broiling, and heating, respectively. For example, the defrost setting 46 is needed for defrosting frozen foods, such as waffles, bagels, pizzas, pastries, and other frozen snack foods. The toasting setting 48 applies to English toast or muffins, bread slices, bagels, etc. The broil setting 50 is useful for English muffins, bagels, pizzas, and hor d'oeuvres. And the heating setting 52 applies anytime one wishes to simply heat a food product, e.g., left-overs, pot pies, etc.

Multi-level toaster 10 is extremely versatile and will permit a variety of embodiments while remaining within the purview of the invention. For instance, in one embodiment, master controls 46–52 can be configured to limit all the toaster modules to one type of cooking, e.g., toasting, while leaving the degree of browning to the separate control of the individual toaster modules 20–26. A group desiring different degrees of toast, even on different types of bread, can thus be served uniquely and simultaneously. In another embodiment, master controls 46–52 can be equipped with means (rotary dials, swing levers, sliding rheostats, computerized touch panels) for setting degrees of cooking applicable to all toaster modules. The master control settings would, in that case, override the settings of the individual toaster modules, possibly even setting their displays to the same setting and illuminating them to show they are on. This feature provides the time-saving advantage of only having to make one setting when desiring to toast all of the bread slices to the same degree of browning, especially important in commercial or institutional use. Of course, this universality of selection applies to the other master controls as well, so that, for example, a plurality of bagel pizzas will all be cooked uniformly. A third embodiment combines the two, providing master controls with degree settings but permitting switching of the master controls between universal and individual control of the existing toaster modules.

A side view schematic of multi-level toaster 10 is shown in FIG. 2. An electrical outlet 54 is preferably provided in wall 16. Outlet 54 is connected to the power source of multi-level toaster 10, which will allow other appliances to be plugged therein and derive power via multi-level toaster 10, thus reducing dependence on limited household outlet availability. A combination on-off switch 56 with a built-in safety or warning light may be added as desired or required by some local codes. Additional outlets 54 may be located on both sides of multi-level toaster 10.

Figure 3:
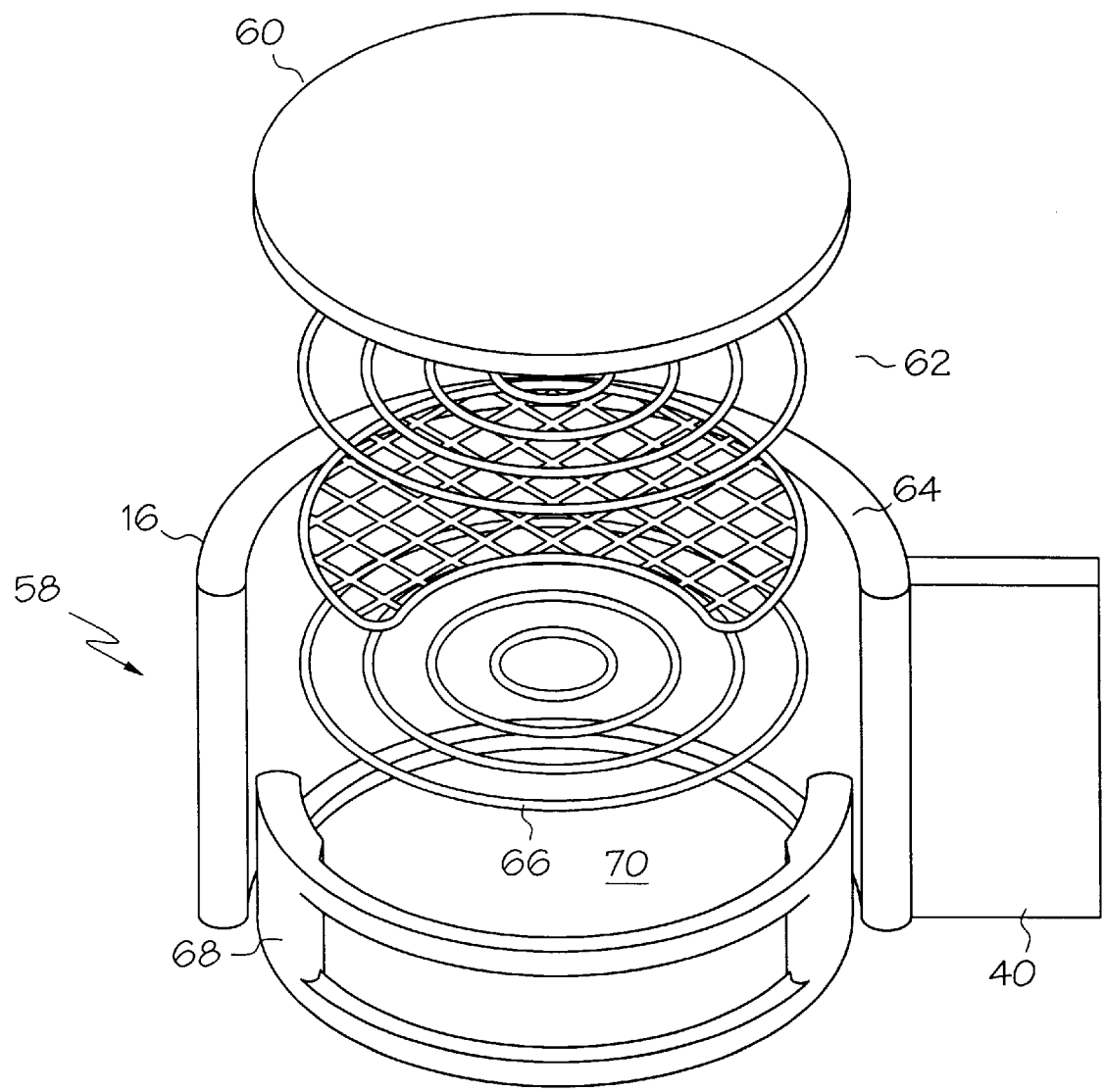
FIG. 3 is a front view of one heating unit with the relative spacings exaggerated for clarity.

A toaster heating unit 58 is shown in FIG. 3. Two such heating units are preferably integrally included in each of toaster modules 20–26. Heating unit 58 comprises an insulating disc 60, an upper heating element 62, a food supporting grill 64, a lower heating element 66, and a crumb catcher 68. The elements are vertically expanded to show them more clearly. In practice, their spacing would be appropriate for their functions. Placement of an insulating disc 60 between levels prevents heat from creeping from one heating unit 58 to another. The toasting integrity of each heating unit is protected by insulating discs 60. Heating elements 62 and 64 are standard heating elements well known in the art. They are collectively controlled by the master controls 46–52 to provide various heating functions. For example, only the upper elements 62 would be activated during the broiling phase of multi-level toaster 10, and all heating elements 62 and 66 would be activated for toasting bread. Grill 64 may assume different configurations as desired, as will be described hereinafter.

It is important to note that each heating unit 58 is horizontally oriented. The footprint of the appliance is thus reduced to essentially the flat dimension of the food product. It is this vertical stacking of horizontal toasters which makes the toaster so useful to home chefs, commercial eatery cooks, and institutional meal preparers, for it conserves valuable countertop space while offering increased serving capacity.

Figure 4:
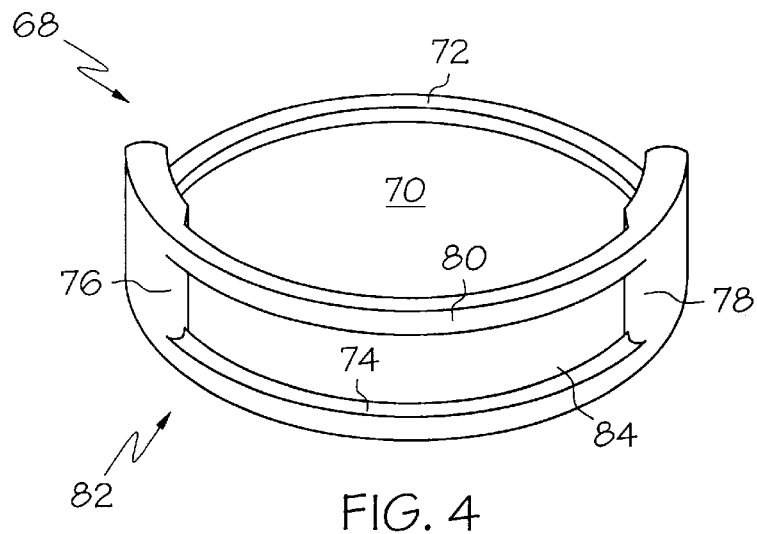
FIG. 4 is a front perspective view of a crumb catcher.
Figure 5:
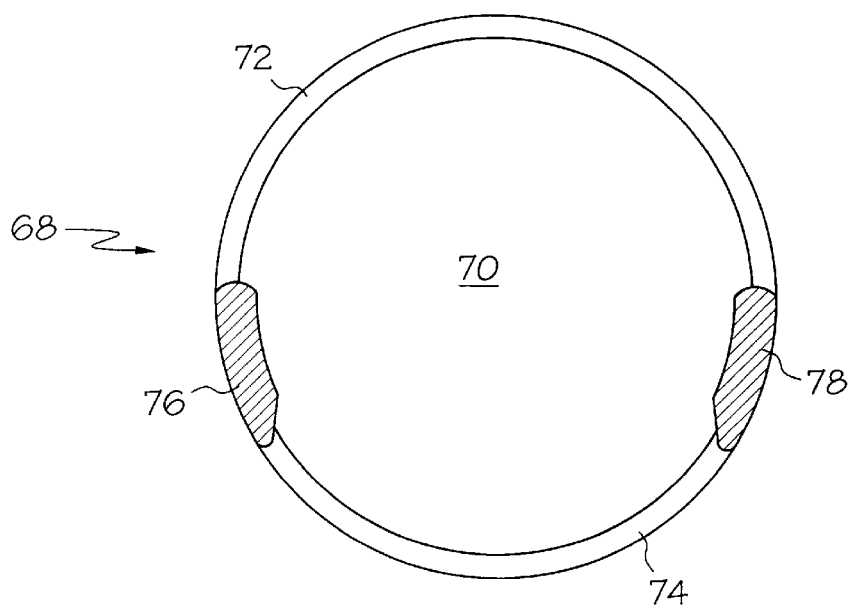
FIG. 5 is a top, cross-sectional view of the crumb catcher of FIG. 4.
Figure 6:
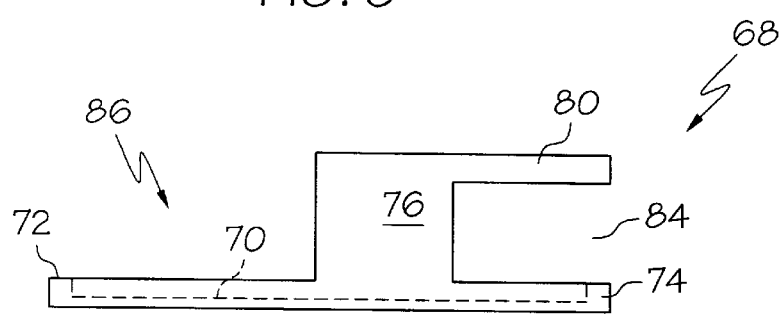
FIG. 6 is a side view of the crumb catcher of FIG. 4.
Figure 7:
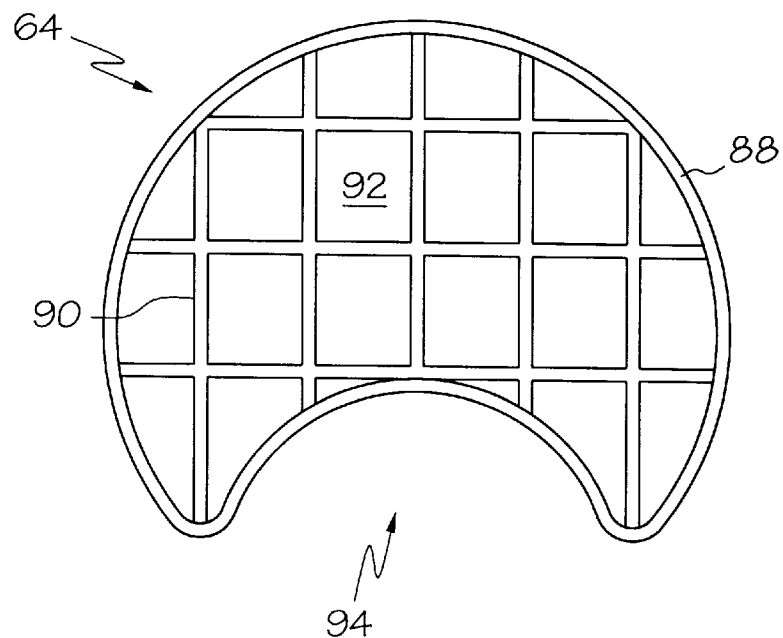
FIGS. 7–8 are top views of two designs for the grill.
Figure 8:
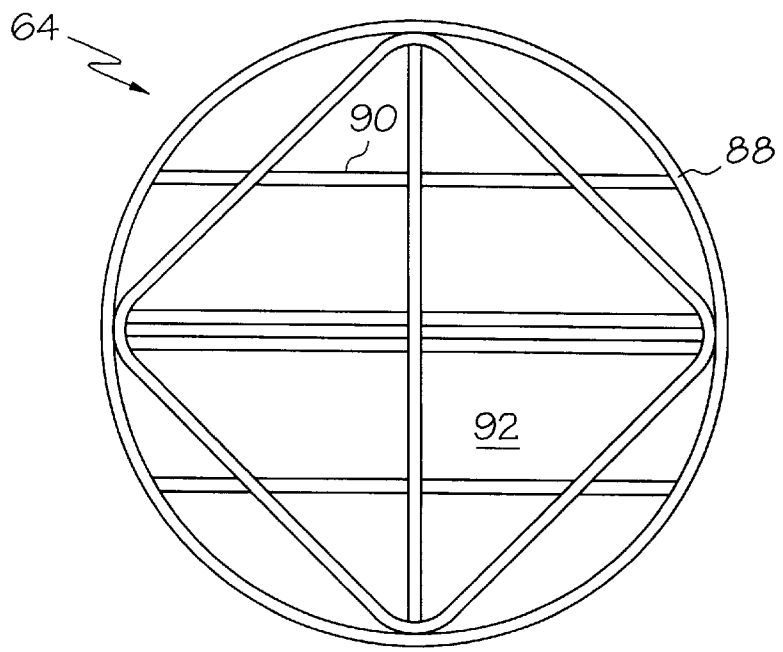

Crumb catcher 68 is shown in more detail in FIGS. 4–6. Crumb catcher 68 is shown as circular in FIGS. 4–6, but can assume any peripheral configuration as dictated by the cross-sectional shape of cylindrical wall 16 (compare FIGS. 9, 13–14, and 17 with FIGS. 10–12). Crumb catcher 68 comprises a flat plate 70 bordered by a short, raised ridge or ring 72, the front portion 74 of which in combination with vertical facia walls 76, 78 and an upper bridge 80 creates a smooth, decorative facade 82.

Portions 74, 76, 78 and 80 form an aperture 84 of sufficient width and height to provide access through facade 82 to the interior of heating unit 58 for insertion of slices of bread or other food products to be toasted, defrosted, grilled, etc., and through which grill 64 may be removed. The types of food products usable in multi-level toaster 10 is limited only by the size of plate 70, the height of ring 72, and the size of aperture 84. Facade 82 completes the exterior of multi-level toaster 10.

As an alternative, bridge 80 may be eliminated in order to reduce the height of multi-level toaster 10 while providing a comparably sized, or larger, aperture. While aperture 84 allows unobstructed removal of the grill and toast, it nonetheless protects upper and lower heating elements 62 and 66 from being exposed to inadvertent touches. Crumb catcher 68 is removable from housing 12 for cleaning. To facilitate the removal of crumb catcher 68 without disturbing lower heating element 66, the rear portion 86 of crumb catcher 68 is preferably lower than bridge 80.

FIGS. 7–12 illustrate a few of the many possible configurations for grill 64. A bordering ring 88 supports a latticework of wires 90 welded or otherwise made integral therewith. Openings 92 formed by latticework 90 allow heat to impinge upon the bread for toasting same. A concave, arcuate indentation 94 (FIG. 7) may be provided to allow the toasted bread to be removed without touching or moving grill 64, which at such time could be very hot. Alternatively, a finger grip 96 (FIGS. 9–12), possibly covered with a heat insulating guard 98, allows grill 64 to be manually moved at least partially from within housing 12 for removal of the toast.

Figure 11:
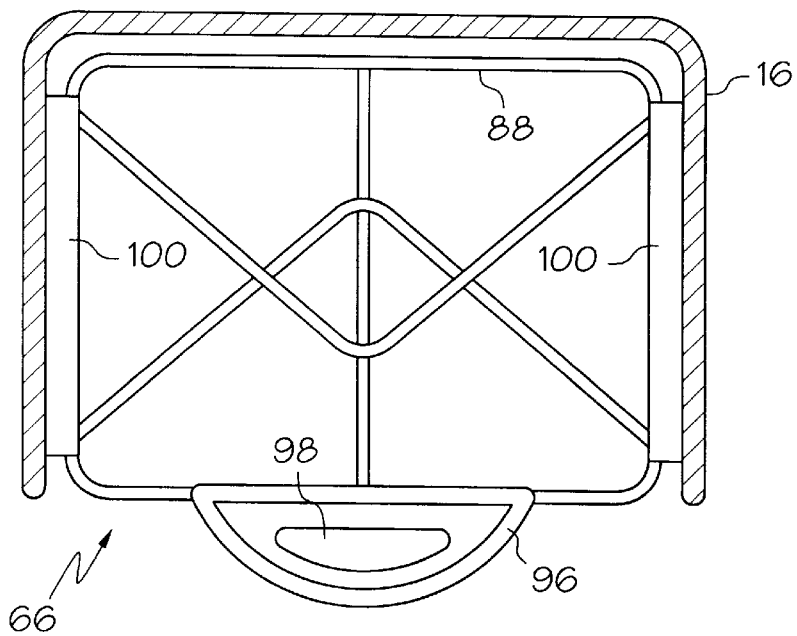
Figure 12:
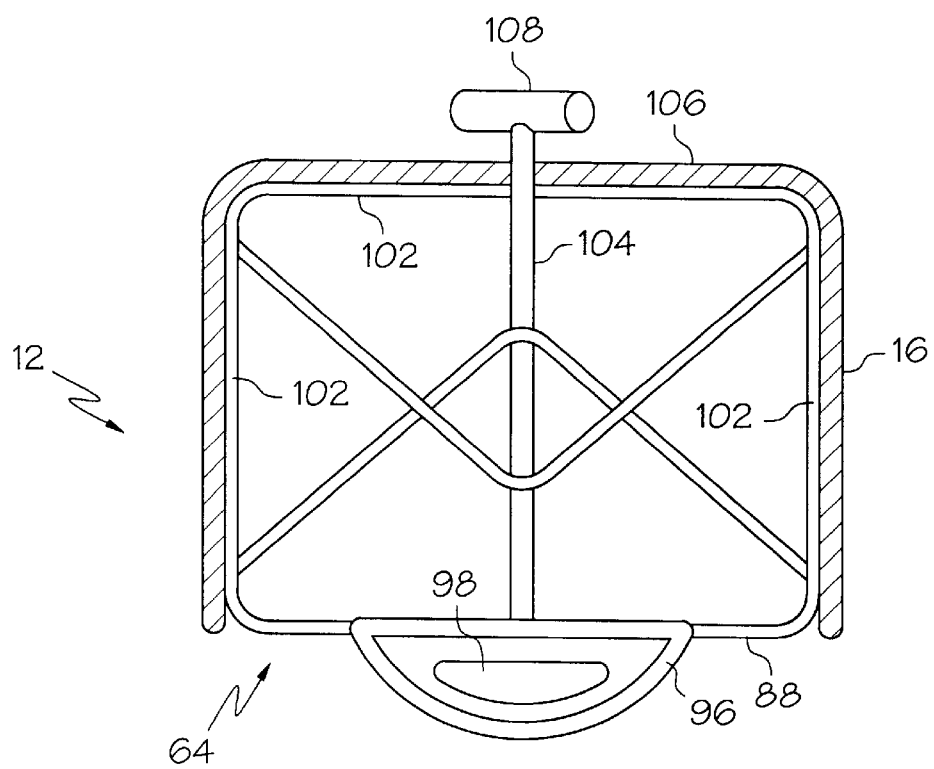

Grills 64 may be supported within housing 12 by any convenient means, such as by resting on laterally located U-shaped shelves 100 (FIG. 11) or forcibly held in snap-fit, U-shaped grooves 102 (FIG. 12).

A means for extending grills 64 from housing 12 may be provided as shown diagrammatically in FIG. 12. A rod 104 extends through a guide aperture 106 in the back of wall 16 and is connected to grill 64. Rod 104 could be removably attached to grill 64 so that grill 64 can be removed for cleaning. Alternatively, rod 104 can be integrally connected to grill 64 and thereby act to position and support grill 64 in housing 12, eliminating the need for snap-fit grooves 102. A vertical rod 108 operatively connects an actuating means, (not shown in FIG. 12, [(e.g.,] e.g., motor driven gears or levers, or a solenoid, etc.; see FIG. 17), to rod 108 for moving same. Automatic control, such as by a thermostat or microprocessor, preferably actuates rod 104 to slide forward when the desired degree of toasting is completed, much like the way toast pops up in vertically oriented toasters. Rod 108 could also be activated manually, if desired.

Figure 9:
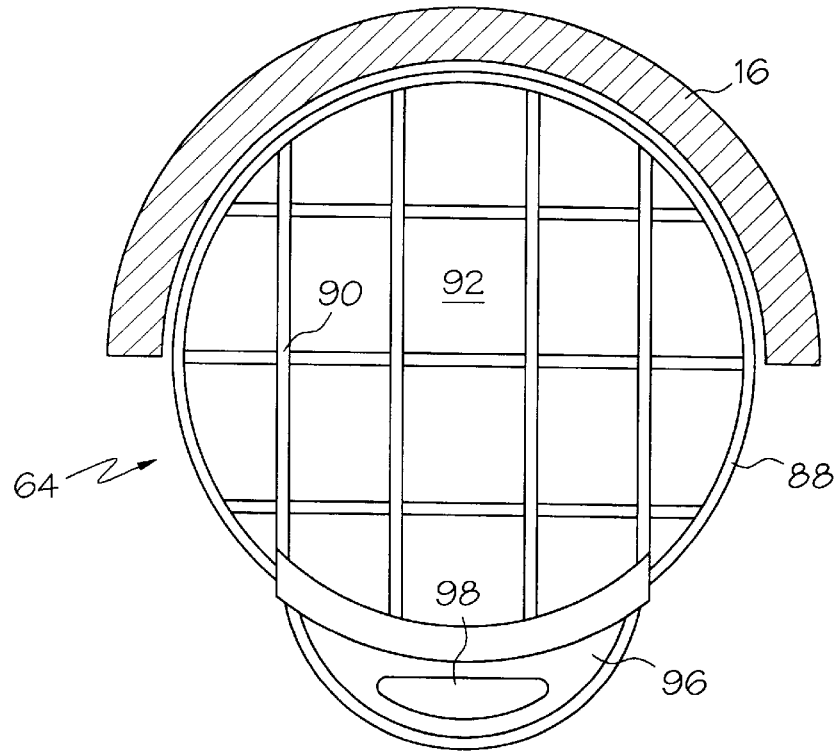
FIGS. 9–12 are top views in cross-section of variants of means for supporting and moving the grill relative to the appliance housing.
Figure 10:
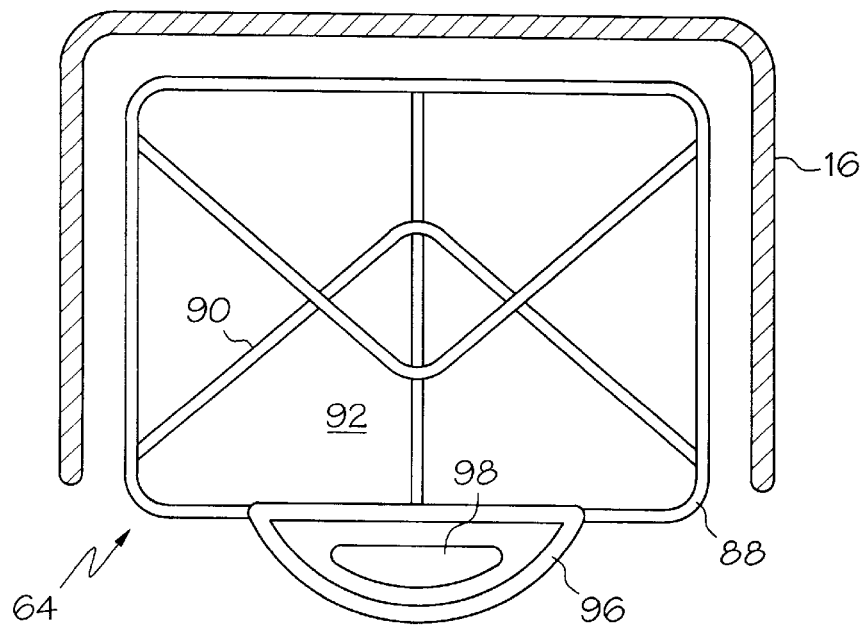

The peripheral shape of grill 64 is selected to conform to the shape of wall 16, which is shown as semi-circular in FIG. 9 and as an open rectangle in FIGS. 10–12.

Figure 13:
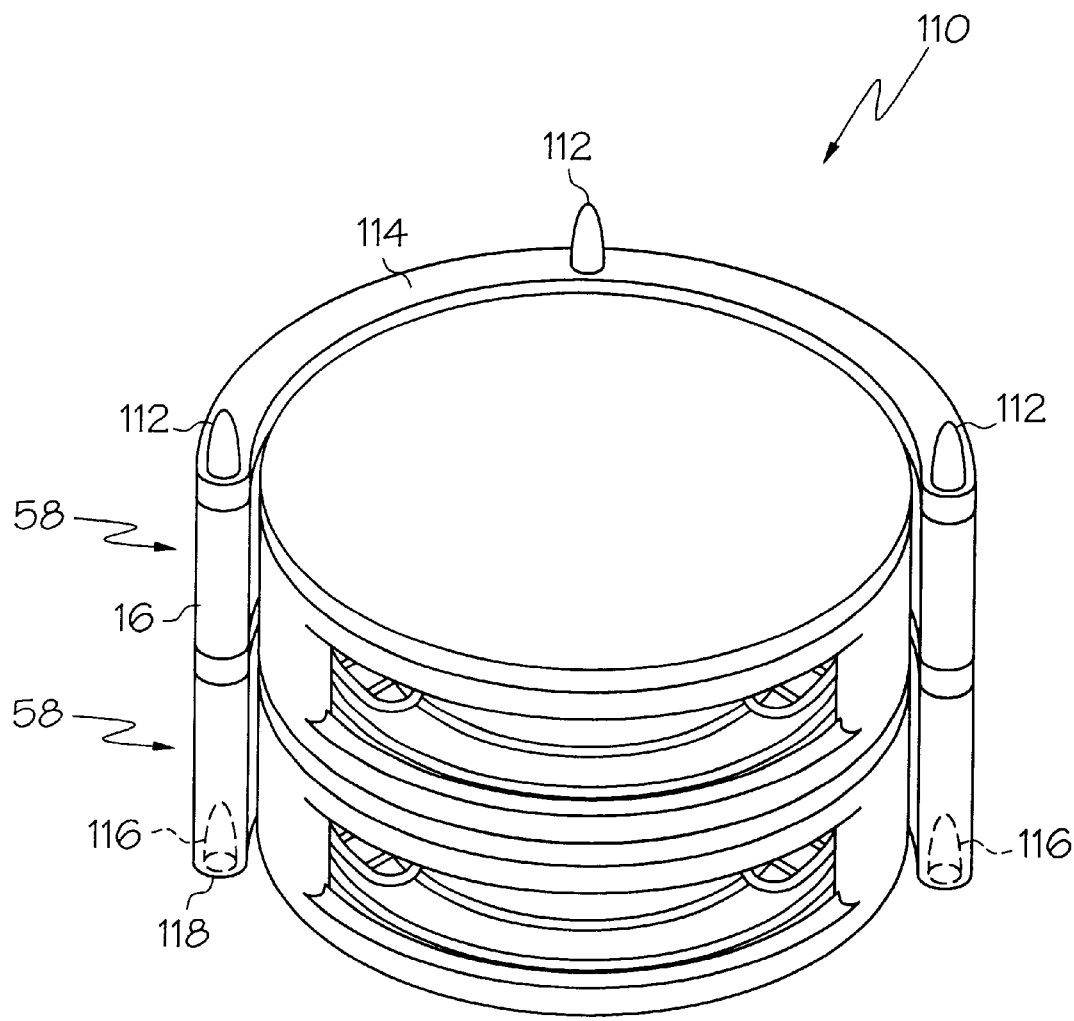
FIG. 13 is a front perspective view of a second embodiment of the invention wherein a pair of heating units are housed in an individual, stackable module.
Figure 14:
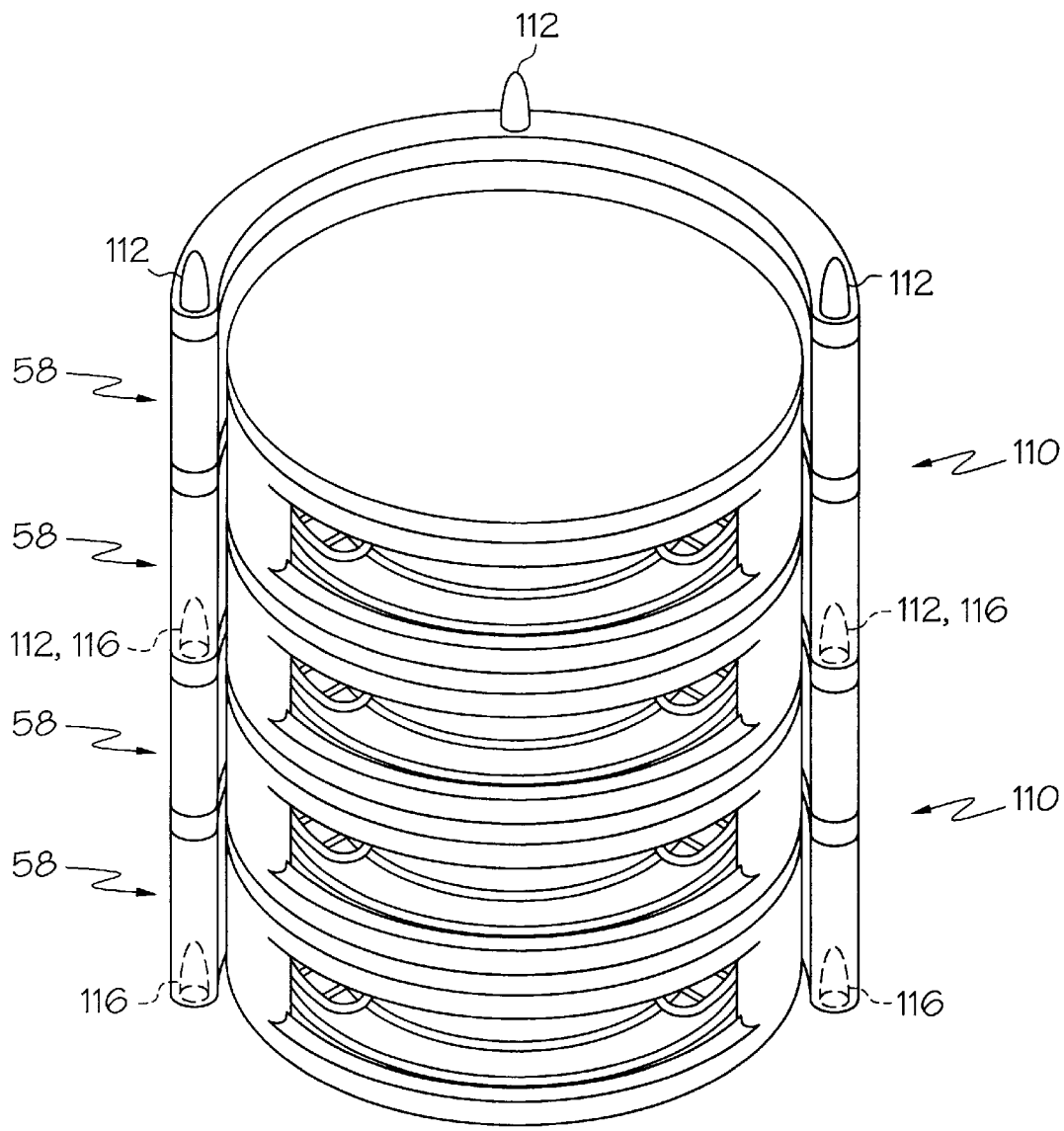
FIG. 14 is a front perspective view of the second embodiment showing two stacked modules.

A second embodiment of the invention is illustrated in FIGS. 13–17. Referring first to FIG. 13, an individual module 110 is shown comprising a pair of heating units 58 housed in an arcuate vertical wall 16. As before, each heating unit 58 includes an insulating disc, an upper heating element, a food supporting grill, a lower heating element, and a crumb catcher, all unnumbered to avoid unduly complicating the figure (see FIG. 3 for details thereof). Module 110 includes a plurality of guide posts 112 spaced around and extending upwardly from the top surface 114 of wall 16 and a correspondingly located plurality of complementary shaped recesses 116 in the bottom surface 118 of wall 16. The complementary shaped posts and recesses allow similar modules to be stacked as shown in FIG. 14 to permit the user to customize a toaster to individual specifications. A top module (not shown) shaped like top 18 having recesses 116 in its lower surface and a base module (not shown) shaped like base 14 with guide posts 112 extending upwardly from its top surface would be provided to complete the multi-level toaster 10. Electrical connections between modules could be effected through posts 112 and recesses 116 which would include suitable mating contacts (not shown).

Figure 15:
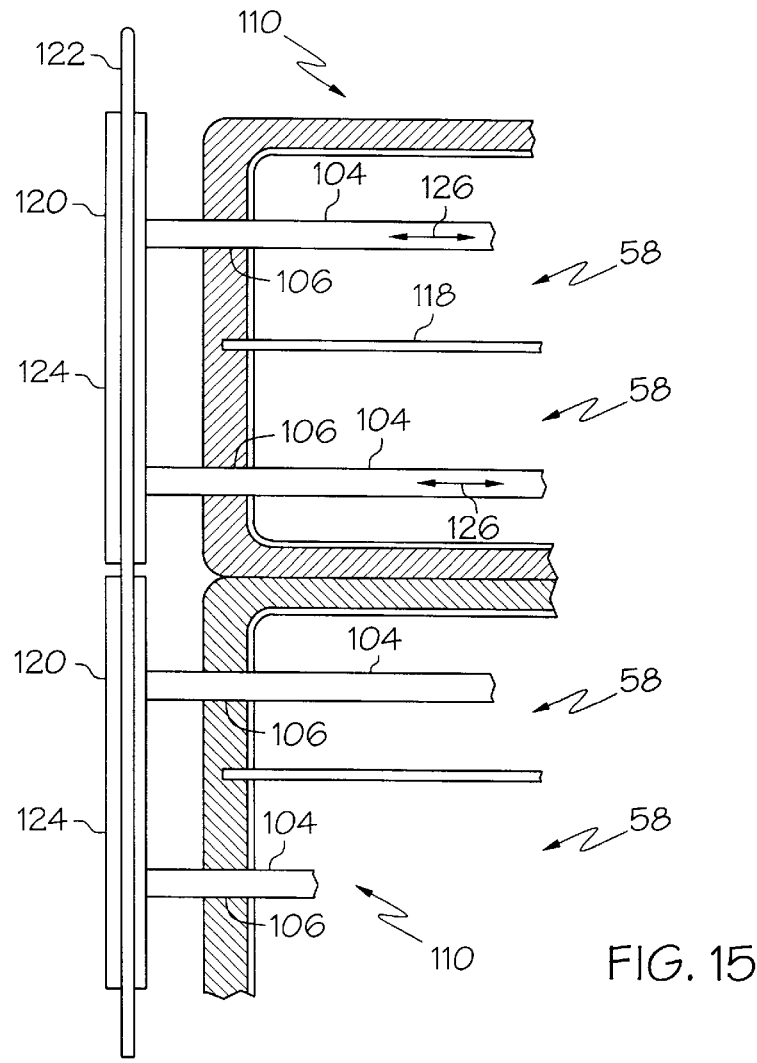
FIG. 15 is a side view, partially broken away and in cross-section, of a means for moving all of the grills simultaneously.
Figure 16:
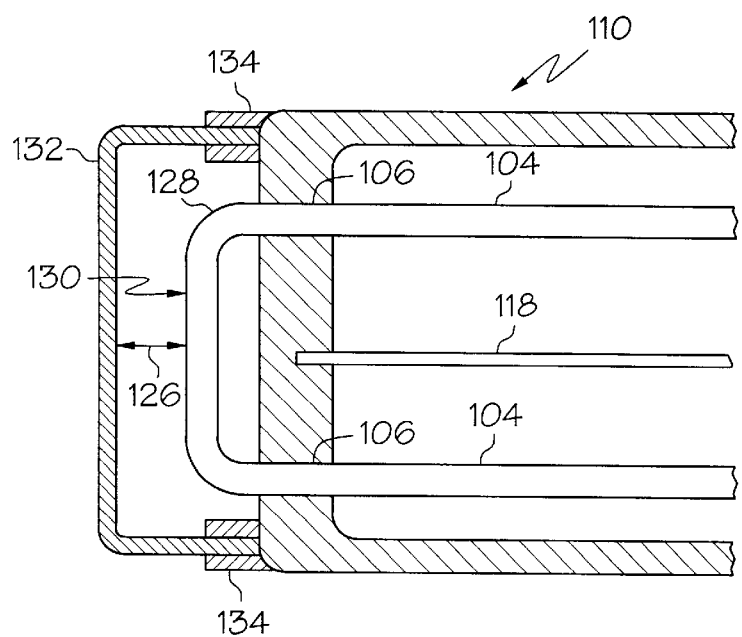
FIG. 16 shows in cross-section a means for moving the grills of a single module.
Figure 17:
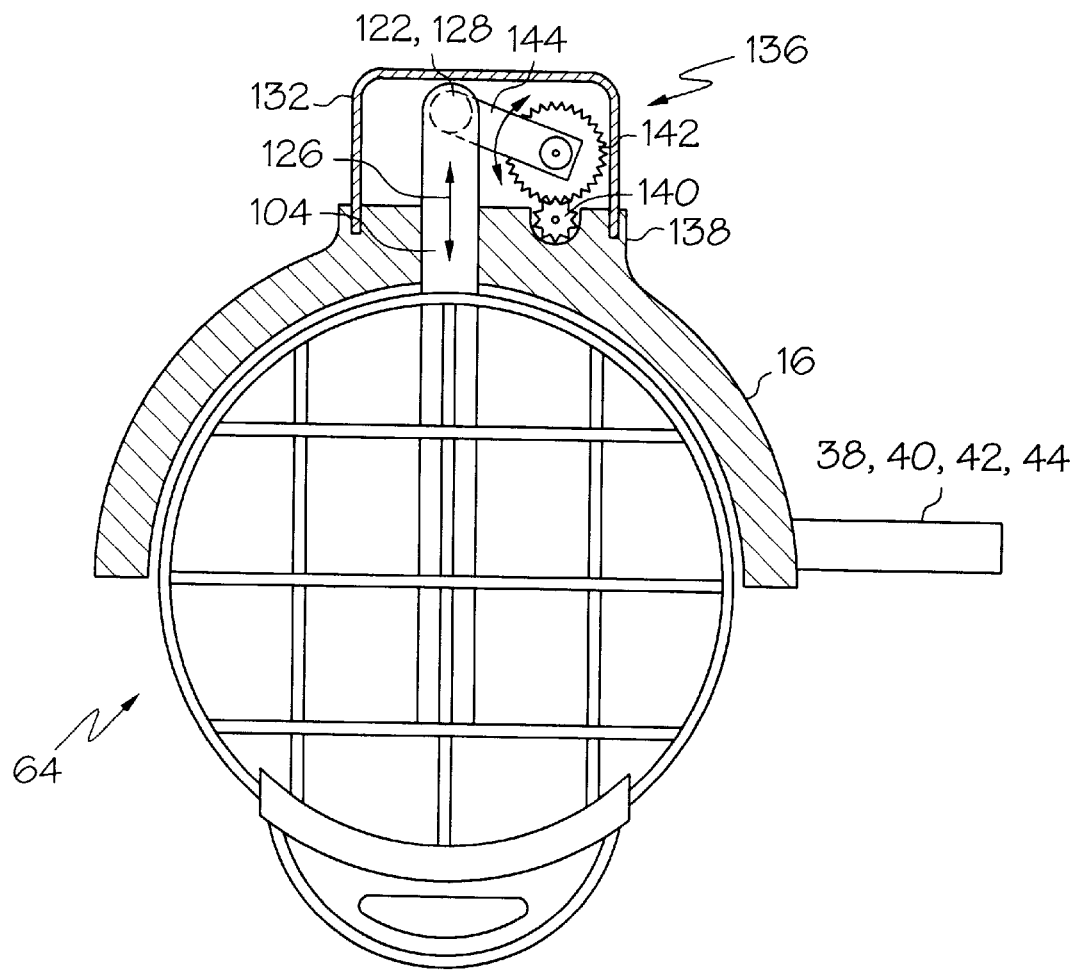
FIG. 17 is a top, cross-sectional view showing a powered drive mechanism for moving the grills of FIGS. 15–16.

FIGS. 15–17 are diagrammatic illustrations of designs of various means similar to that introduced in FIG. 12 for moving grill 64 at the completion of toasting the slices of bread. Referring to FIG. 15, two modules 110, each comprising a pair of heating units 58, are shown broken away in a cross-sectional side view. Modules 110 may be integral, as in FIGS. 1–2, or stacked, as in FIGS. 13–14. An insulating disc 118 separates the two heating units 58 of each module 110. Extending vertically behind each module 110 is a segment of a hollow pipe 120 with rods 104 fixed thereto by any convenient means, such as by screwing into threaded apertures or by welding. Pipe segments 120 are each shown as having a length roughly commensurate with the height of its associated module, but as will be appreciated, it is only necessary that their lengths be capable of connecting the back ends of the two rods 104 in each module 110. A vertical actuating rod 122 extends through pipe segments 120. Preferably, rod 122 is not attached to pipe segments 120, but rather extends therethrough snugly enough to prevent rattling but loosely enough to be vertically slidable therein. The necessity of maintaining close tolerances as to vertical positioning of rod 122 relative to pipe segments 120, rods 108, and heating units 58 is thereby avoided. Rods 104 and their connecting pipe segment 120 form a unit 124. Rod 122 is not attached to pipe segments 120, because rod 122 does not support unit 124. Rod 122 functions only to move all of the units 124, and thereby all of the grills attached to rods 104, laterally, as indicated by arrows 126. When the toast is finished, a thermostat or computer will actuate a motor or solenoid to move rod 122 and thereby pipe segments 120 and rods 104 to the right. Grills 64 (FIG. 17) with the toast thereon will partially extend through apertures 84, so that the toast can be removed from grills 64. The FIG. 15 embodiment is the simplest structure wherein all of the grills 64 of all of the heating units 58 are moved simultaneously.

The rod structure of FIG. 16 is used where each module 110, corresponding to one of toaster modules 20–26, is used independently of the others in multi-level toaster 10. The two rods 104 of a single module are integrally connected by an actuating rod 128, forming a U-shaped unit 130 as shown in the figure. Rod 128 would be actuated independently of the others by an appropriate means, e.g., a solenoid, not shown, which is controlled by the appropriate one of controls 38–44 associated with module 110. In the aforementioned example of each person in a group receiving differently browned toast on different types of bread, the time required to toast its bread by each toaster module would be different than the time required by the others. Consequently, each toaster module must be capable of terminating toasting and popping the toasted bread out independently of the others.

A housing 132 snap-fit into projections 134 covers unit 130 for protection thereof and for aesthetic reasons. Housing 132 would be removed when actuating unit 130 manually, but it would be left in place, except for cleaning and repairs, if housing 132 contained an automatic grill-moving mechanism 136, as shown schematically in FIG. 17.

FIG. 17 shows a top, cross-sectional view of the embodiments of either FIGS. 15 or 16 where identical numbers identify identical parts. Where desired, a reinforcing rib 138 integral with the back of wall 16 may be provided to stably support rods 104, housing 132, and grill-moving mechanism 136. In this embodiment, mechanism 136 comprises an electric motor 140 which drives an oscillating member 142 and a lever 144 connecting oscillating member 142 and either rod 122 or rod 128, as the case may be. Mechanism 136 alternately extends and retracts rods 104 and grill 64, as indicated by arrows 126. A solenoid driven lever system can obviously replace mechanism 136, as can any other known oscillating means, and still be within the purview of the invention.

Numerous modifications and variations of the present invention are possible in light of the above teachings.

What is claimed is:

1. A multi-level toaster, comprising:
    a base;
    a plurality of toaster modules, each of said plurality of toaster modules comprising at least one heating unit;
    said plurality of toaster modules being arranged in a vertical array; and
    a control for selecting a cooking parameter for one or more of said plurality of toaster modules.

2. The multi-level toaster of claim 1, wherein said heating unit further comprises a removable crumb catcher.

3. The multi-level toaster of claim 2, wherein said crumb catcher comprises a substantially flat plate, a raised ring which borders said flat plate, a front portion having two facia walls, said flat plate and said facia walls forming a horizontally oriented slot for insertion and removal of food.

4. The multi-level toaster of claim 2, wherein said heating unit further comprises an insulating disc for reducing heat transfer between each of said plurality of toaster modules.

5. The multi-level toaster of claim 4, wherein said heating unit further comprises an upper heating element, a lower heating element, and a food supporting grill, said grill being located between said upper heating element and said lower heating element.

6. The multi-level toaster of claim 5, wherein said grill includes an indentation to allow a food item located atop said grill to be removed from each of said plurality of toaster modules without touching said grill.

7. The multi-level toaster of claim 5, wherein said grill includes means for at least partially removing said grill from within said heating unit.

8. The multi-level toaster of claim 7, wherein said means for at least partially removing said grill from within said heating unit comprises an insulated finger grip.

9. The multi-level toaster of claim 7, further comprising a housing, said housing having a back wall, said means for at least partially removing said grill from within said heating unit comprising a first rod and an aperture located within said back wall, said first rod being coupled to said grill and extending rearwardly through said aperture.

10. The multi-level toaster of claim 9, wherein said means for at least partially removing said grill from within said heating unit further comprises a second rod, said second rod being coupled to said first rod and means for actuating said second rod.

11. The multi-level toaster of claim 10, wherein said means for actuating said second rod comprises a motor driven gear, a lever, or a solenoid.

12. The multi-level toaster of claim 10, wherein said means for actuating said second rod comprises a lever.

13. The multi-level toaster of claim 10, wherein said means for actuating said second rod comprises a solenoid.

14. The multi-level toaster of claim 1, wherein said plurality of toaster modules comprises a first toaster module and a second toaster module, said first toaster module being removably stackable atop said second toaster module.

15. The multi-level toaster of claim 14, wherein said first and second toaster modules each include a wall, said first toaster module having a guide post protruding from said wall, said second toaster module having a recess, said recess being located in said wall and shaped to accommodate said guide post therein.

16. The multi-level toaster of claim 1, wherein each of said plurality of toaster modules includes an individual heating control for setting a cooking parameter for each of said plurality of toaster modules.

17. An multi-level toaster, comprising:
    a base;
    a plurality of toaster modules, each having a horizontally oriented slot;
    said plurality of toaster modules comprising a first toaster module and a second toaster module; and
    wherein said first toaster module is removably stackable atop said second toaster module.

18. The multi-level toaster of claim 17, wherein said first and second toaster modules each include a wall, said first toaster module includes a guide post protruding from said wall, said second toaster module include a recess, said recess being located in said wall and shaped to receive said guide post.

19. The multi-level toaster of claim 17, wherein each of said plurality of toaster modules includes a heating unit, said heating unit having a removable crumb catcher.

20. The multi-level toaster of claim 19, wherein said crumb catcher includes a substantially flat plate, a raised ring which borders said flat plate, a front portion having two facia walls, said flat plate and said facia walls forming a horizontally oriented slot for insertion and removal of food.

21. The multi-level toaster of claim 19, wherein said heating unit further comprises an insulating disc for reducing heat transfer between said first toaster module and said second toaster module.

22. The multi-level toaster of claim 20, wherein said heating unit further comprises an upper heating element, a lower heating element, and a food supporting grill, said grill being located between said upper heating element and said lower heating element.

23. The multi-level toaster of claim 22, wherein said grill comprises an indentation to allow a food item located atop said grill to be removed from said heating unit without touching said grill.

24. The multi-level toaster of claim 22, wherein said grill includes means for at least partially removing said grill from within said heating unit.

25. The multi-level toaster of claim 24, wherein said means for at least partially removing said grill from within said heating unit comprises an insulated finger grip.

26. The multi-level toaster of claim 24, wherein said means for at least partially removing said grill from within said heating unit comprises a first rod and an aperture located within said wall, said first rod being coupled to said grill and extending rearwardly through said aperture.

27. The multi-level toaster of claim 26, wherein said means for at least partially removing said grill from within said heating unit further comprises a second rod, said second rod being coupled to said first rod and means for actuating said second rod.

28. The multi-level toaster of claim 27, wherein said means for actuating said second rod comprises a motor driven gear.

29. The multi-level toaster of claim 27, wherein said means for actuating said second rod comprises a lever.

30. The multi-level toaster of claim 27, wherein said means for actuating said second rod comprises a solenoid.

31. A multi-level toaster, comprising:
   a base;
   a plurality of toaster modules, each of said plurality of toaster modules comprising at least one heating unit, said heating unit comprising:
      an arcuate wall;
      a horizontally oriented slot;
      a removable crumb catcher having a substantially flat plate, a raised ring which borders said flat plate, a front portion having two facia walls, said flat plate and said facia walls forming a horizontally oriented slot for insertion and removal of food,
      an insulating disc;
      an upper heating element;
      a lower heating element; and
      a food supporting grill, said grill being located between said upper heating element and said lower heating element;
   a master control located on said base for selecting a cooking parameter for said plurality of toaster modules; and
   a housing, said housing comprising a top, a cylindrical wall, and a plurality of floors, one of said plurality of floors being located between each of said plurality of toaster modules.

32. The multi-level toaster of claim 31, wherein said grill comprises an indentation to allow a food item located atop said grill to be removed from said heating unit without touching said grill.

33. The multi-level toaster of claim 31, wherein said grill includes means for at least partially removing said grill from within said heating unit.

34. The multi-level toaster of claim 33, wherein said means for at least partially removing said grill from within said heating unit comprises an insulated finger grip.

35. The multi-level toaster of claim 33, said means for at least partially removing said grill from within said heating unit comprising a first rod and an aperture located within said arcuate wall, said first rod being coupled to said grill and extending rearwardly through said aperture.

36. The multi-level toaster of claim 35, wherein said means for at least partially removing said grill from within said heating unit further comprises a second rod, said second rod being coupled to said first rod and means for actuating said second rod.

37. The multi-level toaster of claim 36, wherein said means for actuating said second rod comprises a motor driven gear, a lever, or a solenoid.

38. The multi-level toaster of claim 36, wherein said means for actuating said second rod comprises a lever.

39. The multi-level toaster of claim 36, wherein said means for actuating said second rod comprises a solenoid.

40. The multi-level toaster of claim 31, wherein each of said plurality of toaster modules includes an individual heating control for setting a cooking parameter for each of said plurality of toaster modules.

41. The multi-level toaster of claim 32, wherein said master control is capable of overriding said individual heating control for each of said plurality of toaster modules.

* * * * *